United States Patent
Renger et al.

Patent Number: 6,062,335
Date of Patent: May 16, 2000

[54] SELF-PROPELLING AGRICULTURAL WORKING MACHINE

[75] Inventors: Hermann Renger, Delbrück; Ludger Gausmann, Hagen a.T.W., both of Germany

[73] Assignee: Class KGaA, Harsewinkel, Germany

[21] Appl. No.: 08/957,619

[22] Filed: Oct. 24, 1997

[30]   Foreign Application Priority Data

Nov. 22, 1996 [DE]   Germany ............................ 196 48 324

[51] Int. Cl.⁷ .................................................. B62D 13/00
[52] U.S. Cl. ............................................................ 180/418
[58] Field of Search .................................... 280/504, 468, 280/442, 467, 484, 482, 490.1, 124.11, 124.111, 112, 116; 180/418, 420; 56/13.6, 16.2

[56]       References Cited

U.S. PATENT DOCUMENTS

| | | |
|---|---|---|
| 3,773,135 | 11/1973 | Mazzarins . |
| 3,995,569 | 12/1976 | Picardat . |
| 4,119,165 | 10/1978 | Bowra . |
| 4,206,825 | 6/1980 | Van Der Lely ........................ 180/775 |
| 4,809,805 | 3/1989 | Short . |
| 5,180,028 | 1/1993 | Perrewold ................................ 180/235 |
| 5,778,569 | 7/1998 | Schaeff ...................................... 37/410 |

FOREIGN PATENT DOCUMENTS

| | | |
|---|---|---|
| 2 622 862 | 5/1989 | France . |
| 701 310 | 12/1940 | Germany . |
| 1 019 852 | 11/1957 | Germany . |
| 86 760 | 12/1971 | Germany . |
| 23 35 479 | 1/1975 | Germany . |
| 23 37 926 U | 4/1986 | Germany . |
| 39 37 124 A1 | 5/1991 | Germany . |
| 983 919 | 2/1965 | United Kingdom . |

*Primary Examiner*—Chris Schwartz
*Assistant Examiner*—C. T. Bartz
*Attorney, Agent, or Firm*—Michael J. Striker

[57]          ABSTRACT

A self-propelling agricultural working machine has a machine frame, a not steerable front axle and a rear axle formed as a dismountable pendulum axle connectable to the machine frame in a predetermined connecting point and provided with steerable wheels, an articulated joint releasably hingedly connectable with the machine frame for coupling the working machine with a trailer vehicle, and connecting elements for alternatingly releasably connecting the pendulum axle and the articulated joint with the machine frame in a region of the connecting point.

9 Claims, 5 Drawing Sheets

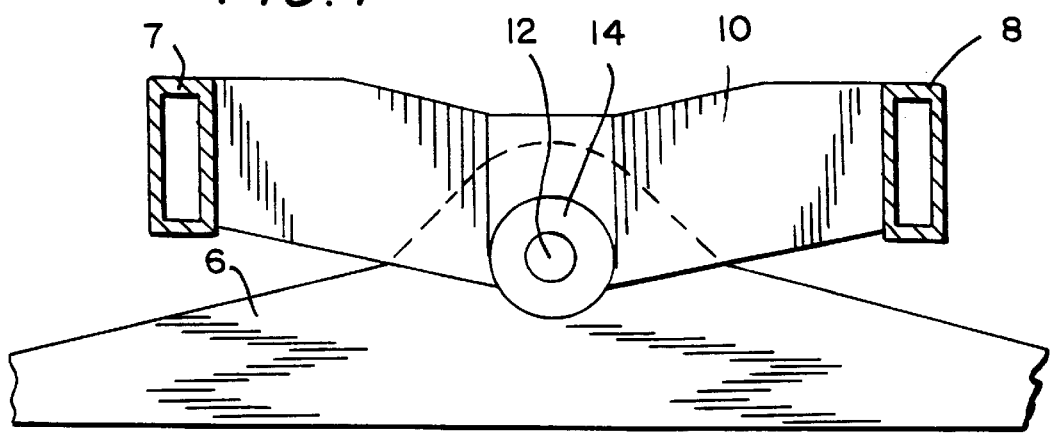
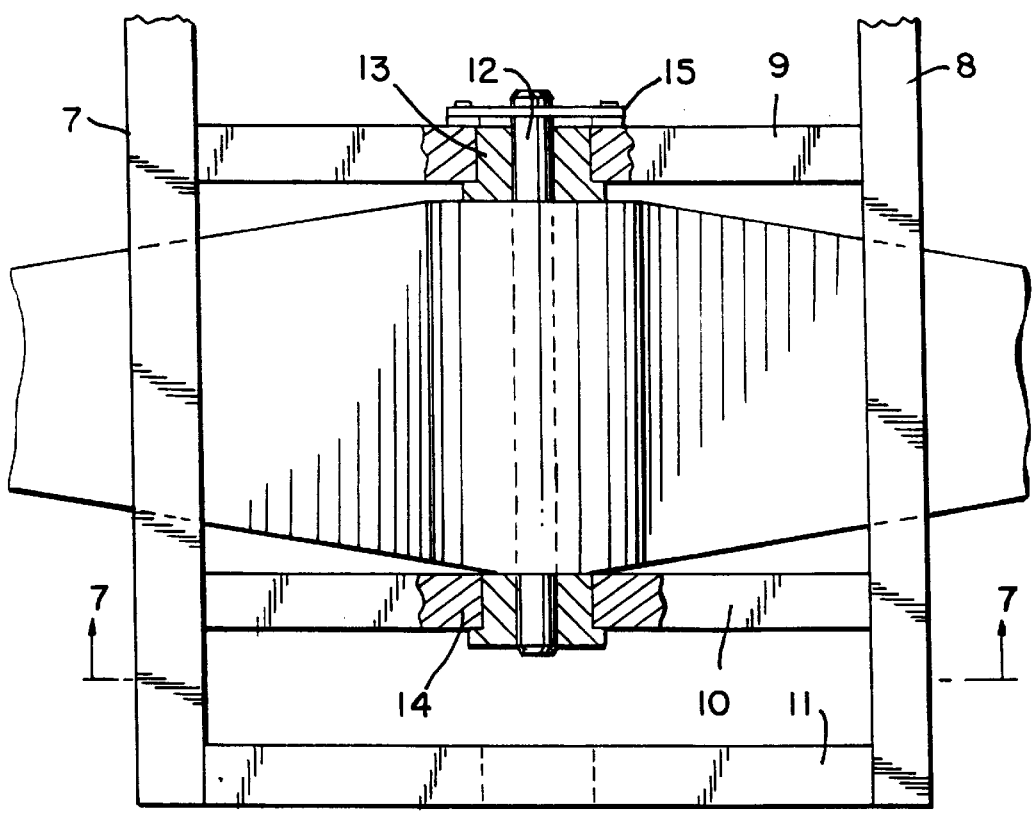

SELF-PROPELLING AGRICULTURAL WORKING MACHINE

BACKGROUND OF THE INVENTION

The present invention relates to a self-propelling agricultural working machine, in particular a field chopper.

Such machines are known in various embodiments. They however have the disadvantage that each machine can be always used only for a predetermined special application and therefore its possible utilization range is correspondingly limited.

In order to increase the service life, for example of field choppers, and to use them as pulling vehicles for a trailer, it is known to dismount the rear axle and to connect the frame of the chopper with a trailer vehicle through an articulated steering axle. Since the articulated steering axle is arranged in the region behind the front axle of the chopper, it is necessary to provide a swivelably moveable support of the total rear machine region on the frame of the pulling vehicle. The substantial disadvantage of this coupling arrangement is that, a conversion to the original condition of the chopper with the rear axle steering is not provided, or it can be performed only with a complicated and time-consuming mounting process.

SUMMARY OF THE INVENTION

Accordingly, it is an object of the present invention to provide a self-propelling agricultural working machine which avoids the disadvantages of the prior art.

More particularly, it is an object of present invention to provide a self-propelling agricultural working machine, in which a coupling point between a field chopper and a trailer vehicle is formed and arranged so that a conversion from a rear axle steering to an articulated steering and vice versa required for corresponding applications can be performed in a simple and fast fashion.

In keeping with these objects and with others which will become apparent hereinafter, one feature of the present invention resides, briefly stated, in a self-propelling agricultural working machine which has connecting means for alternatingly releasably connecting a rear axle provided with steerable wheels and formed as a pendulum axle on the one hand, and an articulated joint for coupling the working machine with a trailer vehicle on the other hand, with the machine frame in the region of the same connecting point.

When the self-propelling agricultural working machine is designed in accordance with the present invention, it eliminates the disadvantages of the prior art and provides for the above mentioned highly advantageous results.

In accordance with another feature of the present invention, the articulated joint can include a bearing plate with vertical walls and receiving walls for a suspension pin, as well as a substantially horizontally arranged roller bearing connected with the bearing plate. The articulated joint can be mounted in a front region of the supporting arm of the trailer vehicle. Also, the articulated joint can be arranged in the region between two frame members of the machine frame instead of the dismounted pendulum axle.

Connections for piston rods of steering cylinder-piston units can be arranged in both outer side regions of the bearing plate. The steering cylinder-piston units can be arranged between the connections on the bearing plate and rigid arms on the supporting frame of the trailer vehicle.

Finally, the bearing plate can be connected with the supporting arm of the trailer vehicle through a roller bearing, so that the inner ring of the roller bearing is fixedly connected with a supporting arm and the outer ring of the roller bearing is fixedly connected with the lower side of the bearing plate.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 6 is a plan view of a pendulum axle bearing on a field chopper in a standard embodiment; and FIG. 7 is a view showing a section taken along the line C—C in FIG. 6.

DESCRIPTION OF PREFERRED EMBODIMENTS

Figure 1:
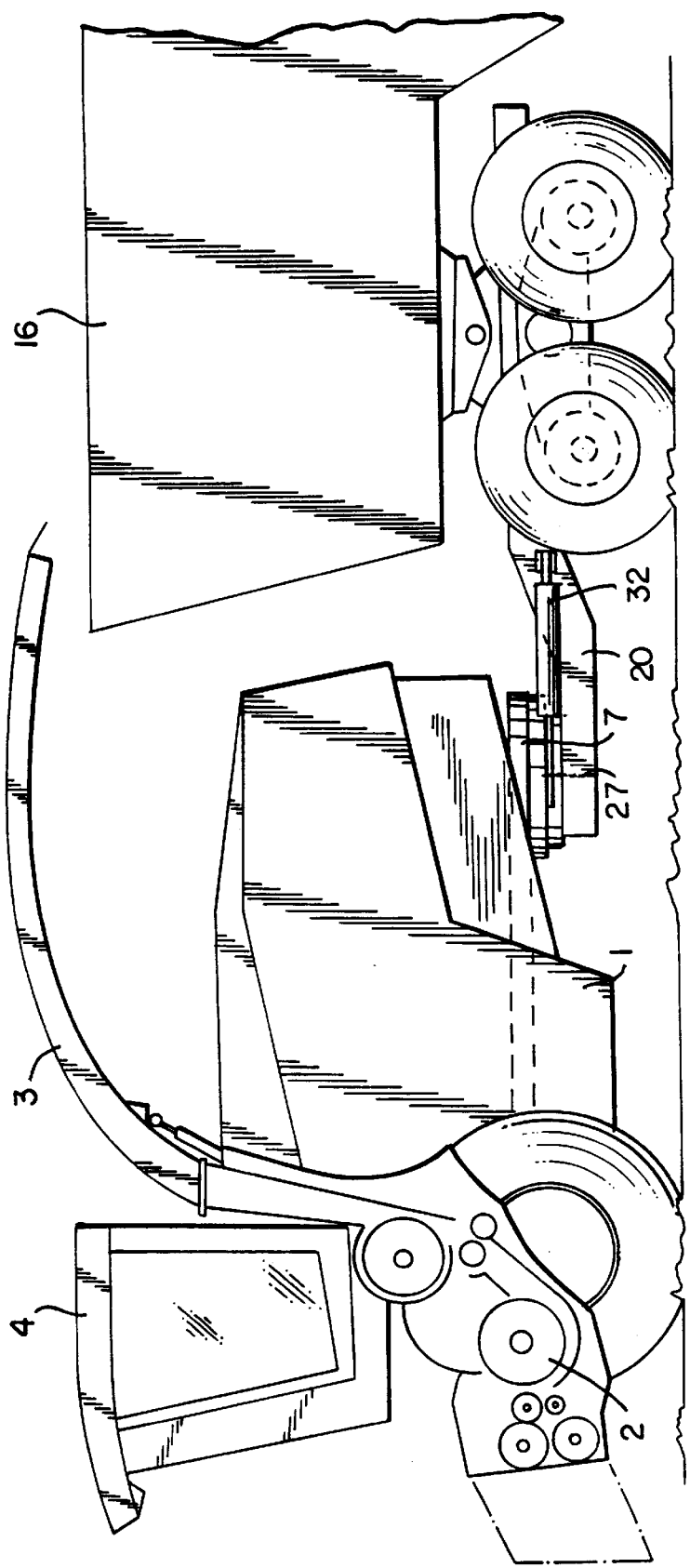
FIG. 1 is a view showing a field chopper and a coupled trailer vehicle with an articulated steering in accordance with the present invention.

A self-propelling agricultural machine in accordance with the present invention includes a field chopper 1 which is provided with a chopping device 2, a discharge passage 3 and a driver's cabin 4. A non-steerable front axle 5 and a steerable rear axle which is formed as a dismountable pendulum axle 6 are arranged on a machine frame. Longitudinal supports 7 and 8 extend parallel to one another in a traveling direction. Three transversely extending frame members 9, 10, 11 are mounted between the longitudinal supports 7 and 8 at their rear end at a distance from one another. An axle pin 12 is arranged between the front frame member 9 and the central frame member 10. It is supported in compensating bushings 13 and 14 centrally on the frame members 9, 10. The pendulum axle 6 is mounted on the axle pin 12. The axle pin 12 is arrested on the frame member 9 by a screwable holder 15.

Figure 2:
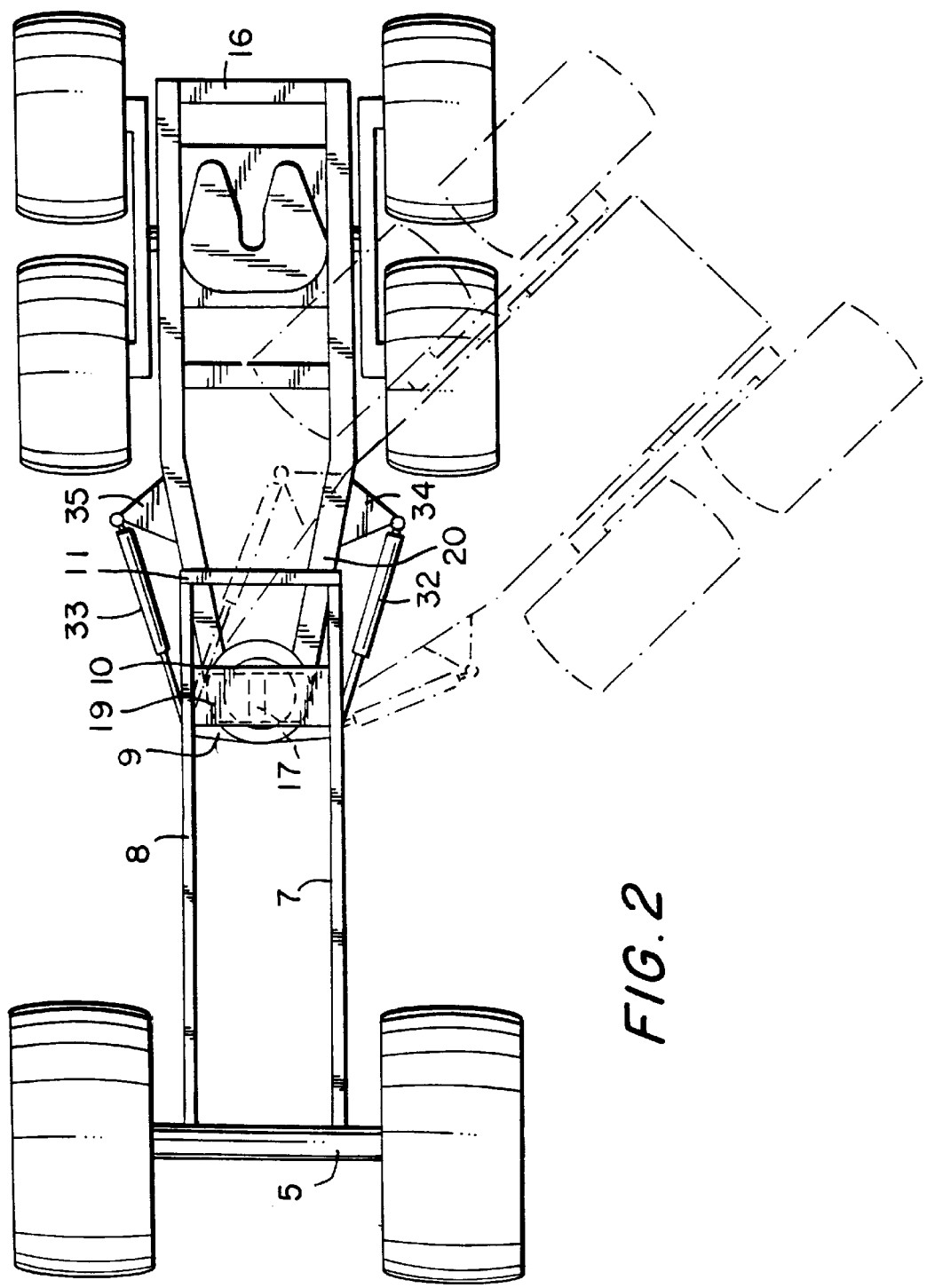
FIG. 2 is a plan view of the construction shown in FIG. 1 in a steering plane, in accordance with the present invention.
Figure 4:
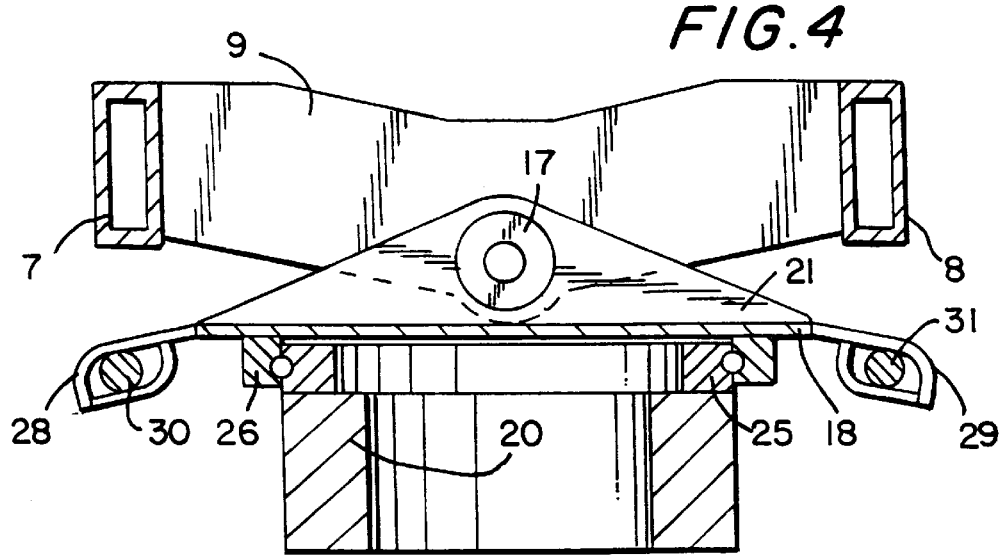
FIG. 4 is a view showing a section taken along the line A—A in FIG. 3.
Figure 3:
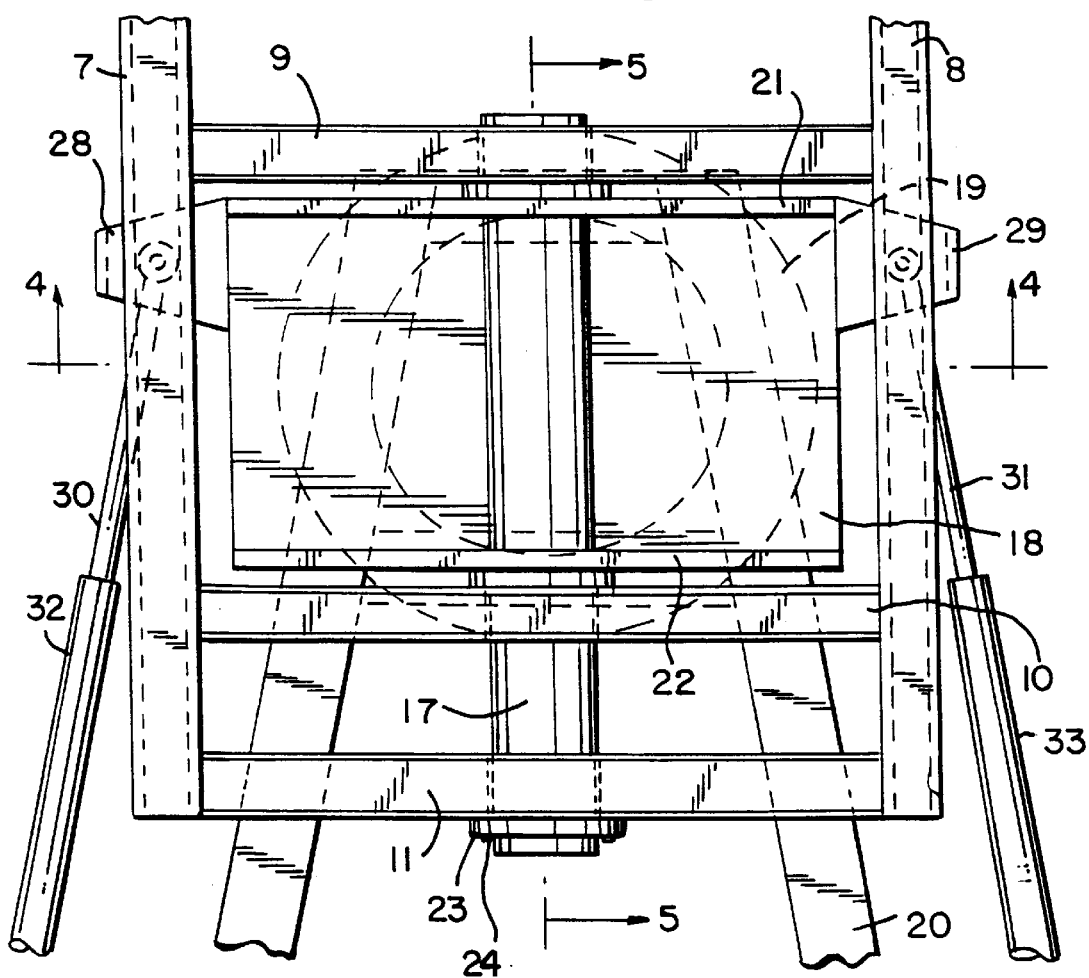
FIG. 3 is a plan view of an articulated joint of the working machine in accordance with the present invention.
Figure 5:
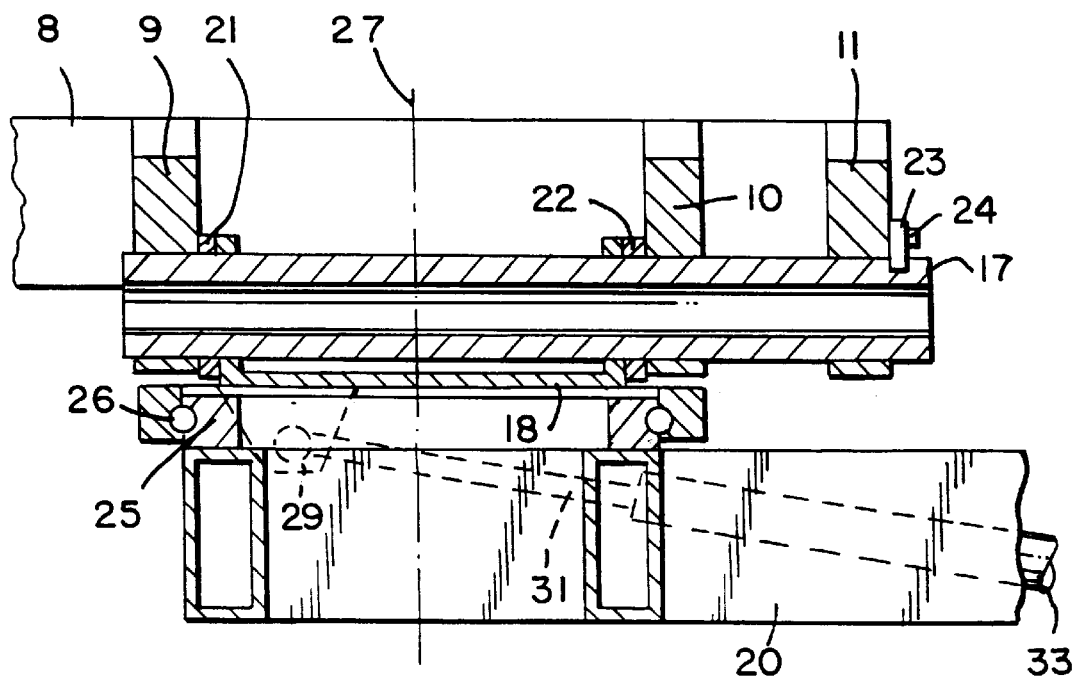
FIG. 5 is a view showing a section taken along the line B—B in FIG. 3.

For converting the field chopper 1 from the standard embodiment shown in FIGS. 6 and 7 with a rear steerable pendulum axis 6 into a pulling vehicle with an articulated steering and coupled trailer 16, the pendulum axis 6 is dismounted and replaced with an articulated joint as shown in FIGS. 1 and 2. The articulated joint includes substantially a suspension pin 17, a bearing plate 18, and a horizontally arranged roller bearing 19 connected with the bearing plate 18.

Before the conversion process, first the machine frame of the field chopper 1 is lifted in the region of the pendulum axis 6 and supported on the ground surface. Then the axle pin 12, the pendulum axle 6, and the compensating bushings 13, 14 are dismounted. A trailer vehicle 16 such as for example a semi-trailer or a container trailer, is hingedly movably connected with the components of the articulated joint mounted in the front region of the supporting arm 20 with the field chopper 1. In particular, the suspension pin 17 provides a connection between the frame members 9, 10, 11 and the vertical walls 21, 22 of the bearing plate 18. The articulated joint is mounted so that the bearing plate 18 is arranged, with the walls 21, 22 located opposite to one another in a traveling direction and provided with receiving openings 4 for the guidance of the suspension pins 17, between the frame members 9 and 10.

The suspension pin 17 has a greater diameter than the original axle pin 12 for strength reasons. The diameter difference is compensated by the dismounted compensating bushings 13, 14. Moreover, the suspension pin 17 is guided and supported in all three frame members 9, 10, 11. Its axial position securing is performed by a holding plate 23 and a screw connection 24 with the frame member 11.

A roller bearing 19 is arranged in a substantially horizontal position and mounted between the supporting frame 20 of the trailer vehicle 16 and the bearing plate 18. The roller bearing 19 has an inner ring 25 which is connected with the supporting frame 20 and an outer ring 26 which is connected with the lower side of the bearing plate 18. Because of this connection, a steering movement about a vertical axis 27 of the articulated joint is possible. Elements for limiting the movement are provided at both sides, for example 45o at each side, for preventing tilting of the vehicle. A pendulum movement of the pulling vehicle and the trailer vehicle relative to one another about the suspension pin 17 is possible in the vehicle longitudinal axis. The total vehicle structure can therefore be adapted to the available terrain conditions in the longitudinal and transverse directions so that a reliable driving is possible for all roadway requirements.

Connections 28 and 29 for piston rods 30 and 31 of steering cylinder-piston units 32 and 33 are provided at both sides of the bearing plate 18. The other ends of the steering cylinder-piston units are articulately connected with arms 34 and 35 which instead are connected with the supporting frame 20 of the trailer vehicle. The articulated steering of the pulling vehicle with the coupled trailer vehicle 16 is performed through the steering cylinder-piston units 32 and 33.

In correspondence with the respective application requirements, the pulling vehicle can be converted back from the articulated steering in a reverse sequence to the above described working process into a field chopper 1 with the pendulum axle 6 and rear axle steering. Thereby the annual possible utilization time is substantially increased and the cost of the machine use are reduced.

It will be understood that each of the elements described above, or two or more together, may also find a useful application in other types of constructions differing from the types described above.

While the invention has been illustrated and described as embodied in self-propelling agricultural working machine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A self-propelled agricultural machine, comprising a first machine frame having a non-steerable front axle; a steerable rear axle formed as a dismountable pendulum axle; first releasable connecting means for pivotably connecting said rear axle to said first machine frame in a determined region of said first machine frame so that said first connecting means can be released and said rear axle can be dismounted from said first machine-frame; a trailer vehicle having at least one further axle and a second frame; an articulated joint releasably connectable with said first machine frame when said first connecting means is released and said rear axle is removed from said first machine frame; said articulated joint coupling said second frame of said trailer vehicle with said first machine frame and being arranged in said region where said first connecting means connect said rear axle with said first machine frame; second connecting means, which connect said articulated joint to said first machine frame; and a suspension pin which hingedly connects said articulated joint with said first machine frame and extends in a longitudinal traveling direction of said first machine frame.

2. A self-propelled agricultural machine as defined in claim 1, wherein said first connecting means includes an axle pin extending in the longitudinal traveling direction of said first machine frame.

3. A self-propelled agricultural machine as defined in claim 2, wherein said first machine frame has frame members, said axle pin and said suspension pin being alternatingly mountable in said frame members of said first machine frame.

4. A self-propelling agricultural working machine as defined in claim 1, wherein said articulated joint is mountable in a front region of a said second frame of the trailer vehicle.

5. A self-propelling agricultural working machine as defined in claim 1, wherein said first machine frame has two frame members, said articulated joint being arrangeable in a region between said frame members when said pendulum rear axle is dismounted.

6. A self-propelling agricultural working machine as defined in claim 1, wherein said articulated joint has a bearing plate; and further comprising steering cylinder-piston units having piston rods; and connections provided for said piston rods and arranged in both outer side regions of said bearing plate.

7. A self-propelling agricultural working machine as defined in claim 6, wherein said steering cylinder-piston units are arranged between said connections on said bearing plate and rigid arms on a supporting arm of the trailer vehicle.

8. A self-propelling agricultural working machine as defined in claim 7; and further comprising a roller bearing connecting said bearing plate with said second frame of the trailer vehicle, said roller bearing having an inner ring which is fixedly connected with said second frame and an outer ring which is fixedly connected with a lower side of said bearing plate.

9. A self-propelling agricultural working machine as defined in claim 1, wherein said articulated joint includes a bearing plate having vertical walls and receiving openings for said suspension pin, and a substantially horizontally arranged roller bearing connected with said bearing plate.

* * * * *